United States Patent [19]

Ashjian et al.

[11] Patent Number: 5,498,596
[45] Date of Patent: Mar. 12, 1996

[54] NON TOXIC, BIODEGRADABLE WELL FLUIDS

[75] Inventors: Henry Ashjian, East Brunswick, N.J.; Larry C. Peel, Aberdeen, Scotland; Thomas J. Sheerin, Woodbridge, N.J.; Robert S. Williamson, St. Cyrus, Scotland

[73] Assignee: Mobil Oil Corporation, Fairfax, Va.

[21] Appl. No.: 128,186

[22] Filed: Sep. 29, 1993

[51] Int. Cl.$^6$ .............................. C09K 7/00; C09K 7/06
[52] U.S. Cl. ............................. 507/103; 507/905
[58] Field of Search ..................... 507/103, 905

[56] References Cited

U.S. PATENT DOCUMENTS

| | | | |
|---|---|---|---|
| 2,969,321 | 1/1961 | Carpenter | 507/103 |
| 4,436,636 | 3/1984 | Carnicom | 507/103 |
| 4,525,285 | 6/1985 | Son et al. | 507/103 |
| 4,876,017 | 10/1989 | Trahan et al. | 252/8.51 |
| 5,045,219 | 9/1991 | Trahan et al. | 252/8.51 |
| 5,096,883 | 3/1992 | Mercer et al. | 507/103 |
| 5,189,012 | 2/1993 | Patel et al. | 507/103 |
| 5,432,152 | 7/1995 | Dawson et al. | 507/103 |

FOREIGN PATENT DOCUMENTS 0325466  1/1989  European Pat. Off. .

*Primary Examiner*—Philip Tucker
*Attorney, Agent, or Firm*—A. J. McKillop; M. D. Kean

[57] ABSTRACT

Well fluids such as drilling muds, especially useful in offshore drilling, are formulated with a hydrocarbon oil blend of a low viscosity poly alpha-olefin (PAO) such as a low molecular weight oligomer of decene together with a $C_{10}$ to $C_{18}$ paraffinic hydrocarbon of petroleum origin and a $C_{10}$ to $C_{18}$ olefin such as dodecene-1 or tetradecene-1. The fluids exhibit good biodegradability and are non-toxic to marine organisms; they also meet viscosity and pour points specifications for formulation into oil based muds.

34 Claims, No Drawings

NON TOXIC, BIODEGRADABLE WELL FLUIDS

FIELD OF THE INVENTION

The present invention relates to well fluids, especially to drilling fluids or muds which are useful in the rotary drilling process used for making wells into subterranean formations containing oil, gas or other minerals. In particular, the invention relates to a drilling mud which contains a hydrocarbon oil of reduced marine toxicity and improved biodegradability.

BACKGROUND OF THE INVENTION

The rotary drilling process is used for making wells for the production of oil, gas and other subterranean minerals such as sulfur. In rotary drilling operations, a drill bit at the end of a drill string is used to penetrate the subterranean formations. This drill bit may be driven by a rotating drill string or a drill motor powered, for example, by hydraulic power. During the rotary drilling operation, a fluid, conventionally referred to as drilling mud, is circulated from the drilling equipment of the surface down to the drill bit where it escapes around the drill bit and returns to the surface along the annular space between the drill bit and the surrounding subsurface formations. The drilling mud lubricates the downhole equipment and brings the formation cuttings to the surface where they can be separated from the mud before it is recirculated. In addition, the drilling mud serves to counterbalance formation pressures and may also form a cake around the walls of the borehole to seal the formations. The lubricating action of the drilling mud is particularly important with the conventional rotating drill string since it provides a lubricant or cushion between the rotating drill pipe and the walls of the borehole, helping to prevent sticking of the drill string in the hole. The characteristics and performance of drilling muds are described, for example, in Kirk-Othmer, Encyclopedia of Chemical Technology, Third Edition, John Wiley and Sons, 1982, under Petroleum (Drilling Muds), to which reference is made for a description of drilling muds and the materials used in formulating them.

Drilling muds are usually classified as either water-based muds or oil-based muds, depending upon the character of the continuous phase of the mud, although water-based muds may contain oil and oil-based muds may contain water. Water-based muds conventionally comprise a hydratable clay, usually of the montmorillonite family, suspended in water with the aid of suitable surfactants, emulsifiers and other additives including salts, pH control agents and weighting agents such as barite. The water makes up the continuous phase of the mud and is usually present in an amount of at least 50 percent of the entire composition; oil may be present in minor amounts but will typically not exceed the amount of the water so that the mud will retain its character as a water-continuous phase material. Oil-based muds on the other hand, generally use a hydrocarbon oil as the main liquid component with other materials such as clays or colloidal asphalts added to provide the desired viscosity together with emulsifiers, gellants and other additives including weighting agents. Water may be present in greater or lesser amounts but will usually not be greater than 50 percent of the entire composition; if more than about 10 percent water is present, the mud is often referred to as an invert emulsion, i.e a water-in-oil emulsion. In invert emulsion fluids, the amount of water is typically up to about 40 weight percent with the oil and the additives making up the remainder of the fluid.

Oil-based muds are conventionally formulated with diesel oil or kerosene as the main oil component as these hydrocarbon fractions generally posses the requisite viscosity characteristics. They do, however, posses the disadvantage of being relatively toxic to marine life and the discharge of drilling muds containing these oils into marine waters is usually strictly controlled because of the serious effects which the oil components may have on marine organisms, particularly those which are commercially important for food. For this reason, offshore drilling rigs must return oil-based muds to shore after they have been used whereas water-based muds may generally be discharged into the ocean without any deleterious effects.

Oil-based muds may be made environmentally acceptable by the use of oils which posses low inherent toxicity to marine organisms and good biodegradability. These properties are associated in hydrocarbons with low aromaticity. For these reasons, drilling fluids based on linear paraffins might be considered desirable. On the other hand, however, the linear paraffins tend to have high pour points and the higher molecular weight fractions tend to be waxy so that in the low temperature environments frequently encountered in offshore drilling, there is a significant risk that waxy paraffin deposits will be formed in the downhole equipment or in the riser connecting the sea bed to the drilling equipment. In either event, this is unacceptable so that highly paraffinic oils have not achieved any significant utility as the base fluids in oil based muds.

U.S. Pat. No. 4,787,990 (Boyd) discloses a low toxicity oil for use in oil- and water-based drilling fluids. The low toxicity of the oil coupled with lack of water sheen as well as the non-fluorescence characteristics which assist in the monitoring of the drill cuttings, are stated to make the muds useful in offshore drilling operations. The oil has a very limited aromatic content (less than 0.5 percent) and a low n-paraffin content (less than 1 percent) in order to confer the desired mud characteristics.

EP 325466 (Trahan/Coastal Mud Inc.) proposes the use of synthetic hydrocarbon fluid in water-based drilling muds and spotting fluids. The synthetic hydrocarbons are poly(alpha-olefins) (PAOs) which are predominantly iso-paraffinic hydrocarbons with no aromatic content. They are produced by the oligomerization of alpha olefins such as 1-decene with the oligomerization product being hydrogenated to reduce residual unsaturation. The oligomers are predominantly dimer, trimer, tetramer and pentamer in order to achieve the desired viscosity of approximately 2 cS (100° C.). In the oligomerization process, the olefin monomer is oligomerized using a homogeneous phase, Lewis acid catalyst such as aluminum trichloride or boron trifluoride. When the oligomerization has proceeded to the desired degree with the PAO product having the requisite viscosity, the catalyst is separated and the initial oligomerization product subjected to hydrogenation, usually over a nickel catalyst, for example, nickel on kieselguhr. A residual monomer content below 0.5% is stated to be desirable. Although the well fluids described in the Trahan application are stated to possess low toxicity, the use of PAOs, which are synthetic materials and therefore relatively costly, is not favorable from the economic point of view. The incentive to develop a drilling mud based on conventional petroleum-based oils therefore remains.

U.S. Pat. No. 5,189,012 (Patel) describes drilling fluids based on oil phase continuous emulsions in which the oil phase consists entirely of a PAO. While such emulsions may possess good properties as described here, the PAOs, being synthetic materials are rather higher in cost than conventional mineral oil based emulsions. There is therefore a continuing need for the development of drilling fluids which are low in cost and have good biodegradability and low marine toxicity.

SUMMARY OF THE INVENTION

We have now found that drilling muds and other well treatment fluids may be formulated to have improved levels of biodegradability and low marine toxicity together with other advantageous properties by using a mixed mineral oil olefinic-paraffinic hydrocarbon component containing from 10 to 18 carbon atoms in addition to a PAO. This paraffinic-olefinic mixture is made up of $C_{10}$–$C_{18}$ paraffins in combination with $C_{10}$–$C_{18}$ olefins to give a blend of the correct viscometrics. With the PAO component present, the hydrocarbon oil has a viscosity of 1 to 4 cS at 100° C. (ASTM D-445), a flash point of at least 70° C., and a pour point no higher than +5° C.

DETAILED DESCRIPTION OF THE INVENTION

According to the present invention, well fluids such as drilling fluids used in the rotary drilling of wells into subterranean formations for the production of oil, gas and other minerals, are formulated with an oil component which is a hydrocarbon blend of a mixed petroleum-based (mineral oil origin) paraffinic-olefinic component and a synthetic PAO component of low viscosity. The blended oil component has a viscosity of 1 to 4 cS at 100° C. (ASTM D-445) and a flash point (ASTM D-93) of at least 70° C., preferably at least 100° C. or higher, for example, at least 120° C. Pour point (ASTM D-97) should be no higher than +5° C., preferably no higher than 0° or even −5° C. The specific gravity of the oil is in the range 0.75 to 0.82. at 60° F. (15.6° C.)(ASTM D-1298)

The mineral oil component of the hydrocarbon blends which are used in the present non-toxic well fluids is produced from conventional mineral oil sources and is essentially a mixture of $C_{10}$–$C_{18}$ n-paraffins and $C_{10}$–$C_{18}$ olefins of low viscosity suitable for formulation into the well fluids after the addition of the PAO component.

The olefinic component of the blend is normally a $C_{12}$–$C_{16}$ olefin, usually an alpha-olefin such as 1-dodecene or 1-tetradecene, for a suitable balance of pour point, flash point and viscosity in the final oil component. The amount of the olefin in the hydrocarbon blend is usually in the range of 5 to 75 weight percent and in most cases, from 10 to 60 weight percent of the blend. Normally, from 15 to about 30 weight percent of the olefin component will be preferred.

The $C_{10}$–$C_{18}$ paraffins make up the bulk of the hydrocarbon blend and are usually n-paraffins although minor amounts of iso-paraffins and cycloparaffins may be present as impurities. The paraffinic mixtures typically contain at least 98 weight percent nparaffins and are essentially free of aromatics (less than 1 and preferably less than 0.5, weight percent monocyclic aromatics). The paraffinic component need not include paraffins across the entire $C_{10}$–$C_{18}$ range but may be more limited in terms of carbon number in order to provide the desired viscometrics. Typical paraffinic mixtures for blending with the olefinic component and the PAO component are shown below. One is a $C_{10}$–$C_{13}$ mixture with a low viscosity, pour point and flash point while the other two are higher carbon number ($C_{12}$–$C_{14}$, $C_{14}$–$C_{18}$) mixtures with correspondingly higher pour points, flash points and viscosities. Paraffinic mixtures such as these may be used either as such or as blends with each other to achieve the desired properties in the final hydrocarbon blend. The amount of the paraffin component will normally be in the range of about 20 to 90 weight percent of the blend, and in most cases in the range of about 30 to 75 weight percent.

| Paraffin Hydrocarbons | | | | |
|---|---|---|---|---|
| Physical Properties | ASTM | Paraffin-A | Paraffin-B | Paraffin-C |
| Viscosity @ 38° C. | D-445 | 1.37 | 1.93 | 2.42 |
| 25° C. | D-445 | 1.68 | 2.41 | 3.27 |
| Pour Point °C. | D-97 | −21 | −4 | 7 |
| Spec. Gravity @ 15.6° C. | D-1298 | 0.751 | 0.764 | 0.771 |
| Flash Point °C. | D-93 | 69 | 93 | 118 |
| Composition, mass % | Mass spec | | | |
| Normal Alkanes | | 98.1 | 98.7 | 99.4 |
| C10 | | 13 | — | — |
| C11 | | 36 | — | — |
| C12 | | 44 | 12 | — |
| C13 | | 7 | 60 | — |
| C14 | | — | 28 | 32–34 |
| C15 | | — | — | 42–45 |
| C16 | | — | — | 16–18 |
| C17 | | — | — | 4–6 |
| C18 | | — | — | 1–3 |
| Isoparaffins | | 0.2 | 0.6 | 0.6 |
| Cycloparaffins | | 1.1 | 0.6 | 0.6 |
| Mono-Aromatics | U.V. | 0.6 | 0.2 | 0.01 |

In addition to the petroleum-based paraffin and olefin components, the well fluids also contain a poly alpha-olefin oligomer (PAO). This component is produced by the oligomerization of a 1-olefin, typically with the use of a cationic catalyst such as a Lewis acid catlyst, for example, born trifluoride or aluminum chloride. Boron trifluoride is preferred as the catalyst since it is a liquid phase, homogeneous catalyst which readily produces the low molecular weight, low viscosity oligomers which are used in the present well fluids. PAOs are well-known materials and are commercially available from a number of sources. Processes for making them are described, for example, in U.S. Pat. Nos. 3,780,128 (Shubkin), 4,405,507 (Cuppies) and 4,405,508 (Cuppies), to which reference is made for a description of such processes. PAOs of low viscosity are also described in U.S. Pat. No. 4,956,122 (Watts). The olefin monomers which are conventionally used in the production of PAOs are the 1-olefins containing from about 6 to about 20 carbon atoms, preferably from 8 to 12 carbon atoms, with particular preference given to 1-decene since the oligomer products have a particularly favorable balance of properties. The olefin oligomers typically possess some residual unsaturation after the oligomerization has taken place and if desired, the oligomers may be hydrogenated prior to use in the present fluids but it is not essential to do so. Bromine numbers on the assynthesized oligomers are typically in the range of 30 to 50 and less than 5, usually less than 2 for the hydrogenated materials. Both the hydrogenated and unhydrogenated oligomers of this type possess good biodegradability.

The PAO components used in the present fluids are the low molecular weight oligomers of the olefins described above. Normally, these PAOs are predominantly $C_{20}$ to $C_{50}$ polyolefins. The molecular weight of the selected PAO will depend on the desired viscometrics for the drilling fluid; the lower molecular weight oligomers have lower viscosities. The PAO oligomers typically have a viscosity in the range of 1 to 6 cS (100° C.), more typically in the range of 1 to 4 cS (100° C.). Flash points are usually above 150° C. for this component. The structure of these oligomers confers good low temeperature properties, as indicated by pour points (D-97) below −40° C. and in most cases below −50° or −60°

C. Typical PAOs which may be used in the present fluids are polydecenes having approximately the following properties:

|  |  |  | PAO-A | PAO-B |
|---|---|---|---|---|
| Viscosity: | D-445 | 100° C. | 1.7 | 2.4 |
|  | D-445 | 40° C. | 5 | 8 |
|  | D-445 | −40° C. | 260 | 625 |
| Pour Point, | D-97 | °C. | −65 | −62 |
| Flash Point, | D-93 | °C. | 160 | 170 |

PAO-A is essentially a decene-1 dimer (over 98% $C_{20}$) while PAO-B is a decene-1 mixed dimer-trimer (over 97.5% $C_{20}$–$C_{30}$), with a dimer-tetramer ratio of about 1.35:1. Other similar PAO materials may be used in the present fluids provided that the desired properties are achieved in the final composition.

The PAO component is used in an amount from 3 to 80 weight percent, typically from 7 to 25, preferably from 10 to 20, weight percent of the total hydrocarbons in the oil component of the mud.

The composition of the hydrocarbon blend including both the $C_{12}$–$C_{18}$ component as well as the $C_{20}$ and higher components from the PAO, is given below.

| Well Fluid Hydrocarbons | | | | | |
|---|---|---|---|---|---|
| Hydrocarbon | Min. | Max. | Pref. Min. | Pref. Max. | Typical |
| Paraffinic/Olefinic Components | | | | | |
| Dodecene | 0 | 3 | 0.5 | 2 | 1 |
| Tetradecane | 5 | 20 | 10 | 20 | 18 |
| Tetradecene | 10 | 60 | 10 | 30 | 19 |
| Pentadecane | 5 | 30 | 15 | 30 | 26 |
| Hexadecane | 3 | 15 | 3 | 15 | 10 |
| Hexadecene | 0 | 0.5 | 0.5 | 2 | 1 |
| Heptadecane | 0 | 5 | 1 | 5 | 3 |
| Octadecene | 0 | 0.5 | 0.5 | 2 | 1 |
| PAO Components | | | | | |
| Eicosane | 5 | 50 | 5 | 15 | 12 |
| Triacontane | 2 | 40 | 5 | 10 | 8 |
| Tetracontane | 0 | 5 | 0.5 | 2 | 1 |

DRILLING MUD FORMULATION

The oil component is formulated into drilling muds or other well treatment fluids such as completion fluids. Formulation will, with the exception of the choice of the specific oil component as the hydrocarbon base fluid, be conventional in type and normal types of additives including emulsifiers, surfactants, viscosity-modifying agents, weighting agents and other components will be suitable. The density of the muds will typically be in the normal range of about 6 to 28 pounds per gallon.

The preferred type of muds using the present oils are oil-based muds, especially the invert-emulsion type muds which contain water disperesed in the oil component which makes up the contiuous phase of the final emulsion-type mud. In muds of the invert emulsion type, the amount of oil in the final mud will typically be from about 25 to 75% by weight, and is typically in the range of 40 to 60% by weight of the final mud. The balance of the mud typically comprises water and the normal additives such as clays, salts such as sodium chloride, calcium chloride or calcium bromide, weighting agents such as barite or hematite (high density fluids) or dolomite or calcite (low density fluids such as completion and work-over fluids), viscosity modifiers, pH control agents, circulation control agents such as ground seed hulls or shredded cellulosic materials and other additives which may be conventional in type. When the oil component is formulated into the mud, conventional blending procedures are used, for example, blending the oil with the emulsifiers and surfactants, followed by mixing with water in the requisite amounts to form the final invert (water-in-oil) emulsion which may then be blended with other additives, as necessary.

If the oil component is used in water-based muds, it would appropriately be used in an amount of up to about 50 weight percent of the mud with the other components being water and conventional type additives, as described above.

The well fluids based on these paraffin/olefin/PAO blends may be used as drilling muds in rotary drilling as well as in other well operations, for example, for filling the well during testing, completion work-over, in the same way as other muds and well treatment fluids. The fluids based on the present oils have, however, the particular advantage that in offshore drilling operations, cuttings contaminated with the fluids may be disposed of by discharge into the sea. The good biodegradability and non-toxicity of the present muds permits this type of cuttings disposal in the ocean environment without any significant risk of persistent pollution.

EXAMPLES

The folowing Examples illustrate the preparation and testing of well fluids according to the present invention. In all the Examples, the oil component, identified as Oil-C was a blend of 60 weight percent of a $C_{14}$–$C_{18}$ paraffinic hydrocarbon oil (Paraffin-C above) and 20 weight percent of tetradecene (99.6 percent 1-olefins, 95.5 percent $C_{14}$, 2.5 percent $C_{16}$) together with 20 weight percent of a 2–4 cS PAO prepared by the oligomerization of 1-decene using a boron trifluoride catalyst (PAO-B above). The final oil blend had the composition set out in the table below, where the $C_{12}$–$C_{18}$ components are derived from the paraffinic oil and the olefin and the $C_{20}$ and higher components come from the PAO.

|  | Hydrocarbon Blend, wt. pct. |
|---|---|
| Dodecene | 1 |
| Tetradecene | 20 |
| Tetradecane | 20 |
| Pentadecane | 25 |
| Hexadecane | 10 |
| Heptadecane | 3 |
| Octadecane | 1 |
| Eicosane | 11 |
| Triacontane | 8 |
| Tetracosane | 1 |
|  | 100 |

EXAMPLE 1

A series of differently weighted 40/60 oil/water muds (10, 12, 14 pounds per gallon-ppg) were made with the oil blend and the following components:

| Emulsifier | Ezmul NT (Baroid) |
|---|---|
| Rheology Modifier | RM 63 (Baroid) |
| Fluid Loss Additive | Duratone HT (Baroid) |
| Organoclay | Geltone II (Baroid) |

The formulations are set out in the table below.

| | 40/60 Oil/Water Mud | | |
|---|---|---|---|
| | 10 ppg | 12 ppg | 14 ppg |
| Oil C (bbl) | 0.325 | 0.303 | 0.275 |
| Ezmul NT (ppb) | 8.0 | 8.0 | 8.0 |
| Duratone HT (ppb) | 2.0 | 2.0 | 2.0 |
| Lime (ppb) | 4.0 | 4.0 | 4.0 |
| Geltone II (ppb) | 1.0 | 1.0 | 0.5 |
| Water (bbl) | 0.504 | 0.464 | 0.425 |
| CaCl$_2$ (82%) (ppb) | 77.0 | 71.4 | 65.3 |
| RM63 (ppb) | 2.0 | — | — |
| Barite (ppb) | 61.5 | 173.4 | 285.5 |

These muds were tested for the following properties, using the test conditions specified:

| Property | Test Conditions |
|---|---|
| Apparent Viscosity (AV) | cps, 600 rpm reading/2 120° F. |
| Plastic Viscosity (PV) | cps, 120° F. |
| Yield Point (YP) | lb/100 sq. ft., 120° F. |
| Gel Strength (Gel) | 10 sec./10 min., 120° F. |
| Electric Strength (ES) | volts, 120° F. |

These properties were determined both before (BHR) and after (AHR) hot rolling at 250° F. for 16 hours, All rheologies and ES were measured at 120° F. The properties of the muds are shown below.

| | Mud Properties | | | | | |
|---|---|---|---|---|---|---|
| | 10 ppg | | 12 ppg | | 14 ppg | |
| | BHR | AHR | BHR | AHR | BHR | AHR |
| AV | 108.5 | 83.5 | 116 | 116 | 127 | 123 |
| PV | 64 | 64 | 86 | 84 | 98 | 95 |
| YP | 89 | 39 | 60 | 64 | 58 | 56 |
| Gel | 40/55 | 14/18 | 21/22 | 19/20 | 18/21 | 17/18 |
| 6 rpm | 45 | 17 | 25 | 24 | 24 | 21 |
| ES | 305 V | 414 V | 414 V | 360 V | 360 V | 387 V |
| HTHP @ 250° F. | — | 2.4 mls | — | 12.8 mls inc 6 mls H$_2$O | — | 13.6 mls inc 6.4 mls H$_2$O |

Note The high HTHP's may be due to the RM 63 being removed from the formulation for the 12 and 14 ppg muds.

EXAMPLE 2

A series of 55/45 oil/water muds were formulated and tested as in Example 1. The formulations and test results are given below.

| | 55/45 Muds | | |
|---|---|---|---|
| | 10 ppg | 12 ppg | 14 ppg |
| Oil C (bbl) | 0.425 | 0.415 | 0.379 |
| Ezmul NT (ppb) | 8.0 | 8.0 | 8.0 |
| Duratone HT (ppb) | 2.0 | 2.0 | 2.0 |
| Lime (ppb) | 4.0 | 4.0 | 4.0 |
| Geltone II (ppb) | 4.0 | 2.5 | 1.0 |
| Water (bbl) | 0.375 | 0.345 | 0.316 |
| CaCl$_2$ (82%) (ppb) | 57.7 | 53.1 | 48.5 |
| RM63 (ppb) | 2.0 | 2.0 | 2.0 |
| Barite (ppb) | 89.5 | 199.7 | 310.0 |

| | Mud Properties | | | | | |
|---|---|---|---|---|---|---|
| | 10 ppg | | 12 ppg | | 14 ppg | |
| | BHR | AHR | BHR | AHR | BHR | AHR |
| AV | 51 | 43 | 60.5 | 44 | 68 | 54.5 |
| PV | 33 | 38 | 37 | 39 | 40 | 45 |
| YP | 36 | 10 | 47 | 10 | 56 | 19 |
| Gel | 19/30 | 12/22 | 25/53 | 10/21 | 20/30 | 14/22 |
| 6 rpm | 21 | 10 | 25 | 10 | 23 | 15 |
| ES | 331 V | 291 V | 467 V | 417 V | 448 V | 456 V |
| HTHP @ 250° F. | — | 3.6 mls | — | 3.8 mls | — | 1.0 mls |

EXAMPLE 3

A series of differently weighted 75/25 oil/water muds (12, 14, 16 ppg) were made and tested as in Example 1. The results are given below.

| | 75/25 Muds | | |
|---|---|---|---|
| | 12 ppg | 14 ppg | 16 ppg |
| Oil C (bbl) | 0.550 | 0.497 | 0.445 |
| Ezmul NT (ppb) | 10.0 | 10.0 | 10.0 |
| Duratone HT (ppb) | 6.0 | 6.0 | 6.0 |
| Lime (ppb) | 4.0 | 4.0 | 4.0 |
| Geltone II (ppb) | 8.0 | 6.0 | 4.0 |
| Water (bbl) | 0.191 | 0.175 | 0.158 |
| CaCl$_2$ (82%) (ppb) | 29.4 | 26.9 | 24.4 |
| RM63 (ppb) | 2.0 | 2.0 | 2.0 |
| Barite (ppb) | 227.3 | 333.8 | 440.3 |

| | Mud Properties | | | | | |
|---|---|---|---|---|---|---|
| | 12 ppg | | 14 ppg | | 16 ppg | |
| | BHR | AHR | BHR | AHR | BHR | AHR |
| AV | 48 | 29 | 59 | 37 | 72 | 45.5 |
| PV | 31 | 24 | 38 | 32 | 49 | 38 |
| YP | 34 | 10 | 42 | 10 | 46 | 15 |

-continued

| | | | | | | |
|---|---|---|---|---|---|---|
| Gel | 24/35 | 6/15 | 27/36 | 7/15 | 25/37 | 9/17 |
| 6 rpm | 22 | 6 | 28 | 7 | 26 | 8 |
| ES | 1101 V | 458 V | 1225 V | 513 V | 1344 V | 723 V |
| HTHP @ 250° F. | — | 54 mls inc 13.4 mls H$_2$O /Emulsion | — | 47.4 mls inc 10 mls H$_2$O /Emulsion | — | 23.8 mls Trace H$_2$O |

EXAMPLE 4

A series of differently weighted (14, 16, 18 ppg) 80/20 oil/water muds were made and tested as in Example 1. The results are given below.

| | 80/20 Muds | | |
|---|---|---|---|
| | 14 ppg | 16 ppg | 18 ppg |
| Oil C (bbl) | 0.524 | 0.469 | 0.416 |
| Ezmul NT (ppb) | 12.0 | 12.0 | 12.0 |
| Duratone HT (ppb) | 7.0 | 7.0 | 7.0 |
| Lime (ppb) | 4.0 | 4.0 | 4.0 |
| Geltone II (ppb) | 7.0 | 5.0 | 3.0 |
| Water (bbl) | 0.138 | 0.126 | 0.113 |
| CaCl$_2$ (82%) (ppb) | 21.3 | 19.4 | 17.4 |
| RM63 (ppb) | 2.0 | 2.0 | 2.0 |
| Barite (ppb) | 344.5 | 451.4 | 558.2 |

| | Mud Properties | | | | | |
|---|---|---|---|---|---|---|
| | 14 ppg | | 16 ppg | | 18 ppg | |
| | BHR | AHR | BHR | AHR | BHR | AHR |
| AV | 50 | 30 | 68 | 53.5 | 95 | 68.5 |
| PV | 34 | 25 | 50 | 38 | 72 | 60 |
| YP | 32 | 10 | 36 | 11 | 46 | 17 |
| Gel | 18/32 | 8/14 | 21/35 | 8/16 | 25/35 | 10/23 |
| 6 rpm | 18 | 6 | 22 | 7 | 25 | 9 |
| ES | 1575 V | 736 V | 1526 V | 976 V | 1425 V | 959 V |
| HTHP @ 250° F. | — | 26.2 mls Trace H$_2$O | — | 37.6 mls | — | 32.2 mls |

EXAMPLE 5

The toxicity of the base oil (Oil C) and two formulated drilling muds was evaluated using organisms representing two trophic levels (*Skeletonema costatum*, algae and *Acartia tonsa*, herbivorous crustacean). Tests were conducted on the dissolved phase of seawater extracts of the three materials, in accordance with ISO/PARCOM protocols (Toxicity Test with Marine Unicellular Algae: Technical Support Document for the ISO DP 10253 Standard Method; Proposal to TC147/SC5WG2: Determination of Acute Lethal Toxicity to Marine Copepods (Copepoda; Crustacea)).

Skeletonema

The effect of the test material was assessed by measuring the degree to which the cell culture growth rate was inhibited. This is expressed as the EC$_{50}$ value; the concentration which reduces growth rate to 50% with respect to the growth rate of control cultures. The test is of 72 h duration, and the intrinsic daily growth rates of cultures are calculated over 24, 48 and 72 h. Duplicate cultures were tested in media prepared from nutrient-enriched seawater to which a range of quantities of the test material had been added.

Rangefinding tests were conducted at 20° C. over 24 h in media prepared from additions of 10, 100, 100 and 10000 mg/l (base oil) or 10, 32, 100 and 320 mg/l (formulated muds). These tests indicated that the base oil was non-toxic at 10000 mg/l added substance, and that the formulated muds were not toxic at 320 mg/l added test substance.

Definitive tests were conducted on the formulated muds at addition rates of 1000, 1800, 3200 and 5600 mg/l. The 48 h and 72 h LC$_{50s}$ for an oil mud formulated using additives from MI GB Ltd (referred to below as "MI mud") were estimated to be 4095 and 4983 mg/l respectively, while the 48 h and 72 h LC$_{50s}$ for an oil mud formulated using additives from BW MUd Ltd. (referred to below as "BW mud") was estimated to be 4820 and 5971 mg/l respectively.

Acartia

Effects on Acartia were assessed in terms of the proportion of individuals dead or immobile after 24 h and 48 h exposure to the test medium, and are expressed as an LC$_{50}$ value; the concentration at which 50% of a test population is killed or immobilized. Adult Acartia (27 days old) were exposed in groups of five in 100 ml crystallizing dishes containing 50 ml of test medium. In rangefinding tests, five animals per concentration were exposed for 24 h at 20° C. In definitive tests, twenty animals were exposed (in four replicates of five) for 48 h under the same conditions.

Test media were prepared by direct addition of the test substance to 0.45 μm-filtered seawater. In the rangefinding tests, additions of 1, 10, 100, and 1000 mg/l were prepared. In definitive tests, additions of 100, 1800, 3200 and 5600 mg/l were prepared.

The base oil and MI mud were not toxic at the highest concentrations tested (5600 mg/l). Mortality was observed at the 5600 mg/l with BW mud, and an approximate LC$_{50}$ of 5400 mg/l was estimated graphically using a log-probability plot.

From these observations it was ocncluded that the three materials tested (base oil, two muds) were of low toxicity to both test organisms. There was some evidence that the formulated muds were more toxic than the base oil. Both muds were of similar toxicity, although the small degree of response did not permit precise calculation or comparison of effects concentrations.

TOXICITY TEST RESULTS

Skeletonema

The starter culture characteristics and the initial inoculum data for the rangefinding tests were as follows:

Starter culture inoculation: $10^3$ cells/ml
Starter culture cell count at 96h: $9.6 * 10^5$ cells/ml Initial test inoculum: 0.29 $\mu m^3.10^6$ The average control growth rate in the rangefinding tests was 1.11 $d^{-1}$. The rangefinding tests indicated that the test material preparations were not toxic (growth was not reduced with respect to the controls) over 24 h at the highest concentrations tested –10000 ppm in the case of the base oil and 320 ppm in the case of the formulated muds (Table 3). Accordingly, definitive tests were conducted on the muds at addition rates between 1000 and 5600 mg/l.

The starter culture characteristics and the initial inoculum data for the definitive tests were:

Starter culture inoculation: $10^3$ cells/ml

Starter culture cell count at 96h: $5.1*10^5$ cells/ml

Initial test inoculum: 103 cells/ml, 0.12 $\mu m^3.10^6$

Raw observations of algal cell volume were made at 24, 48 and 72 h in the definitive tests. Contol growth rate was maintained above the guideline value of 0.9 $d^{-1}$ throughout the tests. Measurements of pH made in all vessels at the start and end of the test, and in controls at 24 h intervals, indicated that values lay between 8.09 and 8.21, and did not vary systematically between test substances or between concentrations.

Both muds were of similar, low toxicity. $EC_{50}$ values were estimated using the moving average-angle method and are shown below.

| | $EC_{50}$ Values for Muds | |
|---|---|---|
| | $EC_{50}$ (mg/l added test subst.) | |
| Test Substance | 48 h. | 72 h. |
| MI Mud | 4090 | 4980 |
| BW Mud | 4820 | 5970 |

Acartia

No mortality was observed in rangefinding tests at any addition rate of any test mud between 1 and 1000 mg/l.

The results of the definitive tests are presented in Table 8. After 24 h, mortality did not exceed 10 % in any treatment, and was not systematically related to treatment level. Control mortality after 48 h was 10 %, and within guideline limits, Control mortality was exceeded after 48 h only at an addition rate of 5600 mg/l of BW mud, and an approximate 48 h $LC_{50}$ of 5400 mg/l was estimated using graphical interpolation (log-probability plot).

| ACARTIA DEFINITIVE TESTS: EFFECTS AT 24 AND 48 H | | | | | | | |
|---|---|---|---|---|---|---|---|
| | Treat- | 24 hours | | | 48 hours | | No. |
| Product | ment | a | b | Mean % | a | b | Mean % | Expsd. |
| Base | 5600 | 0 | 0 | 0 | 0 | 0 | 0 | 20 |
| Oil | 3200 | 0 | 0 | 0 | 0 | 0 | 0 | 21 |
| | 1800 | 0 | 0 | 0 | 0 | 2 | 10 | 20 |
| | 1000 | 0 | 0 | 0 | 0 | 0 | 0 | 20 |
| MI Mud | 5600 | 0 | 0 | 0 | 0 | 0 | 0 | 22 |
| | 3200 | 0 | 0 | 0 | 0 | 0 | 4.8 | 21 |
| | 1800 | 0 | 0 | 0 | 0 | 0 | 0 | 20 |
| | 1000 | 0 | 1 | 5 | 0 | 2 | 9.5 | 21 |
| BW Mud | 5600 | 0 | 0 | 0 | 4 | 8 | 60 | 20 |
| | 3200 | 1 | 1 | 10 | 1 | 0 | 5 | 20 |
| | 1800 | 0 | 0 | 0 | 0 | 0 | 0 | 20 |
| | 1000 | 0 | 0 | 0 | 1 | 1 | 10 | 20 |
| Control | 0 | 0 | 0 | 0 | 0 | 0 | 0 | 20 |
| | 0 | 0 | 0 | 0 | 2 | 0 | 10 | 20 |

ANALYSIS AND INTERPRETATION

Skeletonema

None of the products tested (base oil, muds) caused a severe response in Skeletonema; addition rates of approximately 5000 mg/l or greater are clearly necessary to reduce growth rates by 50%. It was observed that growth rates fluctuated considerably between successive 24 h periods, and that the greatest effects occurred during the 24–48 h interval. The reductions in effect over the final 24 h of the test may have been due either to a loss of test material from the vessels, or, more likely, due to the 'dilution' of effect as biomass increased and the 'load' of test substance per cell decreased (with corresponding increase in surface area for adsorption).

Acartia

None of the products tested (base oil, muds) caused a severe response in Acartia. A 48 h $LC_{50}$ could be estimated only for BW mud, but this figure is approximate since a clear response was observed only at the highest concentration tested. As with the Skeletonema tests, the 50% effects levels were clearly in the region of, or above, 5000 mg/l added substance.

EXAMPLE 6

Blend Studies

Well fluid blend studies were made with paraffins, olefins and PAOs. The hydrocarbon blends set out in the tables below were formulated with olefins (dodecene-1 or tetradecene-1), paraffins (Paraffin-A, Paraffin-B or Paraffin-C., above) and PAOs (PAO-A or PAO-B, above). The blends were tested for viscometrics and flash point. The results below show that it is possible to achieve the desired viscometrics with the described blends according to the invention.

| PAO-A BLEND STUDY | | | | | | | | | |
|---|---|---|---|---|---|---|---|---|---|
| Blend A- | 1 | 2 | 3 | 4 | 5 | 6 | 7 | 8 | 9 |
| PAO-A | 20 | 20 | 20 | 20 | 20 | 20 | 50 | 50 | 50 |
| Dodecene-1 | 40 | 40 | 40 | | | | 25 | 25 | 25 |
| Tetradecene-1 | | | | 40 | 40 | 40 | | | |
| Paraff-A | 40 | | | 40 | | | 25 | | |
| Paraff-B | | 40 | | | 40 | | | 25 | |
| Paraff-C | | | 40 | | | 40 | | | 25 |
| Visc. 100° C. | 0.71 | 0.80 | 0.88 | 0.81 | 0.92 | 1.01 | 0.99 | 1.06 | 1.13 |
| 40° C. | 1.72 | 1.95 | 2.18 | 1.99 | 2.26 | 2.52 | 2.59 | 2.79 | 2.99 |
| Pour Pt. °C. | −34 | −28 | −24 | −26 | −20 | −15 | −44 | −40 | −37 |
| Flash Pt. °C. | 89 | 98 | 108 | 90 | 100 | 110 | 102 | 108 | 115 |

| PAO-B BLEND STUDY | | | | | | | | | | | | |
|---|---|---|---|---|---|---|---|---|---|---|---|---|
| Blend B- | 1 | 2 | 3 | 4 | 5 | 6 | 7 | 8 | 9 | 10 | 11 | 12 |
| PAO-A | 20 | 20 | 20 | 20 | 20 | 20 | 20 | 20 | 20 | 20 | 20 | 20 |
| Dodecene-1 | 40 | 40 | 40 | | | | | | | 20 | 20 | 20 |
| Tetradecene-1 | | | | 40 | 40 | 40 | 20 | 20 | 20 | | | |
| Paraff-A | 40 | | | 40 | | | 60 | | | 60 | | |
| Paraff-B | | 40 | | | 40 | | | 60 | | | 60 | |
| Paraff-C | | | 40 | | | 40 | | | 60 | | | 60 |
| Visc. 100° C. | 0.92 | 0.93 | 0.99 | 1.0 | 1.0 | 1.14 | 0.81 | 0.96 | 1.17 | 0.75 | 0.90 | 1.04 |
| 40° C. | 1.88 | 2.13 | 2.38 | 2.16 | 2.45 | 2.74 | 2.0 | 2.3 | 2.71 | 1.88 | 2.26 | 2.67 |
| Pour Pt. °C. | −26 | −30 | −8 | −22 | −12 | −65 | −28 | −19 | −3 | −32 | −23 | −16 |
| Flash Pt. °C. | 82 | 96 | 104 | 88 | 110 | 128 | 94 | 109 | 124 | 91 | 105 | 120 |

We claim:

1. A well fluid which comprises a hydrocarbon blend of:

(i) a poly alpha-olefin (PAO) component having a viscosity of 1 to 6 cS and:

(ii) a paraffinic hydrocarbon component of petroleum origin in the $C_{10}$–$C_{18}$ range comprising at least 98 weight percent n-paraffins and less than 1 weight percent monocyclic aromatics, and (iii) an olefinic hydrocarbon component in the $C_{12}$–$C_{18}$ range, the proportions of the PAO component, the paraffinic hydrocarbon component and the olefinic hydrocarbon component being such that the blend has the following properties:

| | |
|---|---|
| Viscosity at 100° C. | 0.5 to 4 cS |
| Viscosity at 40° C. | 1.0 to 30 cS |
| Pour point | not above +5° C. |
| Flash point | not less than 70° C. |

2. A well fluid according to claim 1 in which the blend has the following properties:

| | |
|---|---|
| Viscosity at 100° C. | 0.7 to 2 cS |
| Viscosity at 40° C. | 2.0 to 20 cS |
| Pour point | not above +5° C. |
| Flash point | not less than 70° C. |

3. A well fluid according to claim 2 in which the blend has a flash point of at least 100° C.

4. A well fluid according to claim 2 in which the blend has a pour point from −60° to +5° C.

5. A well fluid according to claim 4 in which the blend has a pour point from −60° to 0° C.

6. A well fluid according to claim 2 in which the PAO component has a viscosity at 100° C. of 1 to 6 cS.

7. A well fluid according to claim 2 in which the PAO component has a viscosity at 100° C. of 1 to 4 cS.

8. A well fluid according to claim 7 in which the PAO component is an oligomer of a $C_8$–$C_{18}$ 1-olefin.

9. A well fluid according to claim 8 in which the PAO component is a dimer of a $C_8$–$C_{18}$ 1-olefin.

10. A well fluid according to claim 8 in which the PAO component is a mixed dimer/trimer of a $C_8$–$C_{18}$ 1-olefin.

11. A well fluid according to claim 9 in which the 1-olefin is 1-decene.

12. A well fluid according to claim 10 in which the 1-olefin is 1-decene.

13. A well fluid according to claim 1 in which the amount of the PAO component is from 3 to 80 weight percent of the blend.

14. A well fluid according to claim 1 in which the amount of the PAO component is from 15 to 25 weight percent of the blend.

15. A well fluid according to claim 1 in which the paraffinic hydrocarbon component comprises a fraction in the $C_{10}$–$C_{14}$ range.

16. A well fluid according to claim 1 in which the paraffinic hydrocarbon component comprises a fraction in the $C_{12}$–$C_{16}$ range.

17. A well fluid according to claim 16 in which the paraffinic hydrocarbon component comprises a fraction in the $C_{12}$–$C_{14}$ range.

18. A well fluid according to claim 1 in which the paraffinic hydrocarbon component comprises a fraction in the $C_{14}$–$C_{18}$ range.

19. A well fluid according to claim 1 in which the olefinic component comprises a 1-olefin in the $C_{12}$–$C_{16}$ range.

20. A well fluid according to claim 19 in which the olefinic component comprises 1-dodecene.

21. A well fluid according to claim 19 in which the olefinic component comprises 1-tetradecene.

22. A well fluid according to claim 1 in which the hydrocarbon blend includes the following components, in weight percent, based on the weight of the hydrocarbon blend:

| | |
|---|---|
| dodecane | 0 to 3 |

| | |
|---|---|
| tetradecane | 5 to 30 |
| tetradecene | 10 to 60 |
| pentadecane | 5 to 30 |
| hexadecane | 3 to 15 |
| hexadecene | 0 to 5 |
| heptadecane | 0 to 5 |
| octadecane | 0 to 5 |
| eicosane | 5 to 50 |
| triacontane | 2 to 40 |
| tetracontane | 0 to 5 |

23. A well fluid according to claim 1 in which the hydrocarbon blend includes the following components, in weight percent, based on the weight of the hydrocarbon oil:

| | |
|---|---|
| dodecene | 0.5 to 2 |
| tetradecane | 10 to 25 |
| tetradecene | 10 to 30 |
| pentadecane | 15 to 30 |
| hexadecane | 3 to 15 |
| hexadecene | 0.5 to 2 |
| heptadecane | 1 to 5 |
| octadecene | 0.5 to 2 |
| eicosane | 5 to 15 |
| triacontane | 5 to 10 |
| tetracontane | 0.5 to 2 |

24. A well fluid according to claim 1 in which the hydrocarbon blend includes the following components, in weight percent, based on the weight of the hydrocarbon oil:

| | |
|---|---|
| dodecene | 0.5 to 2 |
| tetradecane | 15 to 20 |
| tetradecene | 15 to 20 |
| pentadecane | 20 to 30 |
| hexadecane | 5 to 15 |
| hexadecene | 0.5 to 2 |
| heptadecane | 2 to 5 |
| octadecene | 0.5 to 2 |
| eicosane | 5 to 15 |
| triacontane | 5 to 10 |
| tetracontane | 0.5 to 2 |

25. A well fluid according to claim 1 in which the hydrocarbon blend includes the following components, in weight percent, based on the weight of the hydrocarbon oil:

| | |
|---|---|
| decane | 5 to 10 |
| undecane | 10 to 30 |
| dodecane | 20 to 30 |
| tridecane | 0 to 10 |
| tetradecene | 10 to 60 |
| eicosane | 5 to 50 |
| triacontane | 2 to 40 |
| tetracontane | 0 to 5 |

26. A well fluid according to claim 25 in which the hydrocarbon blend includes the following components, in weight percent, based on the weight of the hydrocarbon oil:

| | |
|---|---|
| decane | 5 to 10 |
| undecane | 20 to 30 |
| dodecane | 20 to 30 |
| tridecane | 2 to 5 |
| tetradecene | 10 to 30 |
| eicosane | 5 to 15 |
| triacontane | 5 to 10 |
| tetracontane | 0.5 to 2 |

27. A well fluid according to claim 1 in which the hydrocarbon blend includes the following components, in weight percent, based on the weight of the hydrocarbon oil:

| | |
|---|---|
| dodecane | 5 to 10 |
| undecane | 20 to 50 |
| tetradecane | 10 to 30 |
| tetradecene | 5 to 40 |
| eicosane | 5 to 50 |
| triacontane | 2 to 40 |
| tetracontane | 0 to 5 |

28. A well fluid according to claim 27 in which the hydrocarbon blend includes the following components, in weight percent, based on the weight of the hydrocarbon oil:

| | |
|---|---|
| dodecane | 5 to 10 |
| undecane | 30 to 40 |
| tetradecane | 10 to 20 |
| tetradecene | 10 to 30 |
| eicosane | 5 to 15 |
| triacontane | 5 to 10 |
| tetracontane | 0.5 to 2 |

29. In a well-drilling operation in which a well is drilled into a subterranean formation in a rotary drilling operation in which a drilling mud is circulated down a drill string and returned to the surface, the improvement comprising the use of a drilling mud of improved biodegradability and reduced marine toxicity as claimed in claim 1.

30. In a well-drilling operation in which a well is drilled into a subterranean formation in a rotary drilling operation in which a drilling mud is circulated down a drill string and returned to the surface, the improvement comprising the use of a drilling mud of improved biodegradability and reduced marine toxicity as claimed in claim 2.

31. In a well-drilling operation in which a well is drilled into a subterranean formation in a rotary drilling operation in which a drilling mud is circulated down a drill string and returned to the surface, the improvement comprising the use of a drilling mud of improved biodegradability and reduced marine toxicity as claimed in claim 22.

32. In a well-drilling operation in which a well is drilled into a subterranean formation in a rotary drilling operation in which a drilling mud is circulated down a drill string and returned to the surface, the improvement comprising the use of a drilling mud of improved biodegradability and reduced marine toxicity as claimed in claim 23.

33. In a well-drilling operation in which a well is drilled into a subterranean formation in a rotary drilling operation in which a drilling mud is circulated down a drill string and returned to the surface, the improvement comprising the use of a drilling mud of improved biodegradability and reduced marine toxicity as claimed in claim 24.

34. In a well-drilling operation in which a well is drilled into a subterranean formation in a rotary drilling operation in which a drilling mud is circulated down a drill string and returned to the surface, the improvement comprising the use of a drilling mud of improved biodegradability and reduced marine toxicity as claimed in claim 25.

* * * * *